Jan. 3, 1939. F. T. IRGENS Re. 20,961
UNDERWATER EXHAUST MECHANISM
Original Filed Feb. 6, 1930
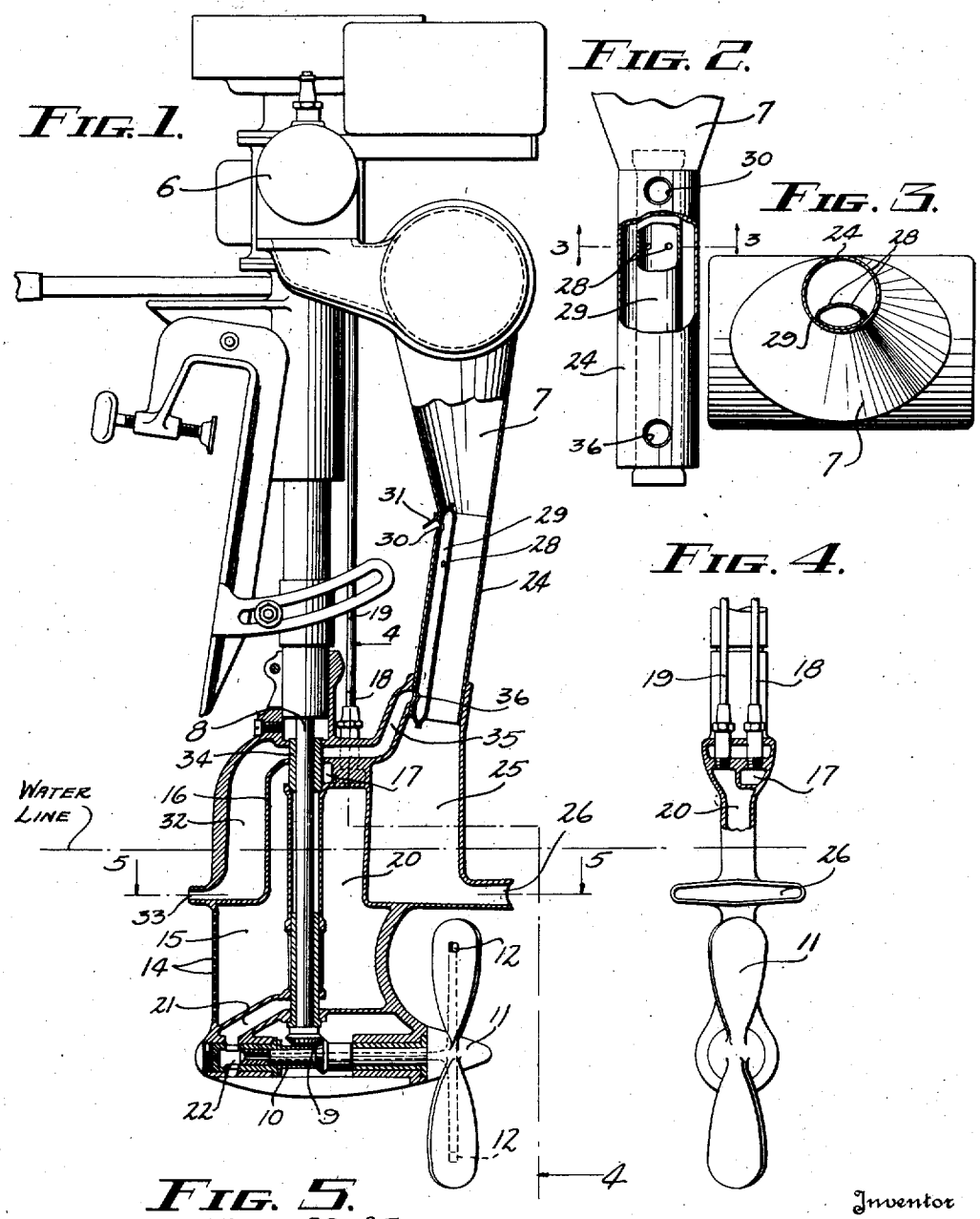
Inventor
Finn T. Irgens
Wheeler, Wheeler & Wheeler
Attorneys Reissued Jan. 3, 1939

Re. 20,961

UNITED STATES PATENT OFFICE 20,961

UNDERWATER EXHAUST MECHANISM

Finn T. Irgens, Milwaukee, Wis., assignor, by mesne assignments, to Outboard, Marine & Manufacturing Company, Wilmington, Del., a corporation of Delaware Original No. 1,785,089, dated December 16, 1930, Serial No. 426,249, February 6, 1930. Application for reissue April 29, 1938, Serial No. 205,279

19 Claims. (Cl. 115—17)

This invention relates to improvements in under water exhaust mechanism, with particular reference to outboard motors.

It is the primary object of the invention to provide an automatic cutout for under water exhausts including a by-pass port for permitting the exhaust to pass directly into open air when the engine is started, and means for automatically sealing said port when the under water exhaust passages are freed of water by operation of the boat. It is my purpose to accomplish these results with no moving parts and without the use of valves or like mechanisms by establishing a water seal for the by-pass port which is rendered effective by the same means which frees the under water exhaust passages of water.

In the drawing:

Figure 1 shows a conventional type of outboard motor in side elevation, the lower unit of such motor and the exhaust passages being shown in vertical axial section.

Figure 2 is a fragmentary detail, in front elevation, of a portion of the exhaust manifold shown independently of the water conduits applied thereto in Figure 1, and partially broken away to expose its interior construction.

Figure 3 is a detail view taken in the plane indicated at 3—3 in Figure 2.

Figure 4 is a view partially in elevation and partially in section in the planes shown by the lines 4—4 in Figure 1.

Figure 5 is a section taken in the plane indicated at 5—5 in Figure 1.

Like parts are identified by the same reference characters throughout the several views.

The outboard motor herein illustrated is of conventional design with the exception of the water seal feature hereinafter to be described. It includes an engine having cylinders, of which one is shown at 6, exhausting into a manifold passage 7. The engine operates the usual drive shaft 8 by which motion is transmitted through the bevelled gearing 9 to a hollow propeller shaft 10, carrying a propeller 11 having ports 12 in its blades communicating with the interior of the hollow shaft.

The cooling system for the engine is of a well known type wherein cooling water is admitted through ports 14 to chamber 15 formed in the forward part of the lower unit. In the present device this chamber is constricted by a partition 16. Chamber 15, however, communicates through duct 17 with a supply pipe 18 leading to the cylinder jacket. The return pipe 19 from the cylinder jacket leads to chamber 20 in the lower unit which communicates through a duct 21 and the ported plug 22 with the front end of the hollow propeller shaft 10 through which water is exhausted centrifugally by the radial passages in the blades of propeller 11.

The water circulation system has been described briefly in order to bring out the fact that the water seal herein referred to is established by means entirely independent of the cooling system. The exhaust connections and the means for supplying the water seal for the by-pass ports therein will now be described.

The exhaust manifold 7 leads through conduit 24 to the chamber 25 in the lower unit which has an outlet at 26 in the form of a flat rearwardly extending tube, the delivery end of which is preferably located beyond the propeller 11. The water passing such tube during operation of the outboard motor in boat propulsion has an aspirating effect which withdraws the gases from the manifold substantially as rapidly as such gases arrive in the manifold from the engine cylinders. The effect of this withdrawal of exhaust gases from the manifold not only eliminates back pressure therein but actually leaves the interior of the manifold substantially at atmospheric pressure. This condition is obtained, however, only when the device is operating substantially at the full speed for which it is designed. At lesser speeds there is a lesser aspirating effect at the discharge orifice in the flattened tube 26.

When the engine is started with the motor at rest the chamber 25 will contain water to a depth considerably in excess of that indicated by the water line shown in Figure 1, which is the approximate water line during full speed operation on a "planing" boat. This water will oppose any delivery of exhaust gases through the port at 26. In order to avoid excessive back pressure it is desirable to provide means for exhausting gases directly into the atmosphere and for that purpose I have provided by-pass ports 28 which open into a pipe 29 which communicates at 30 with the atmosphere. A deflector 31 is preferably associated with port 30 in order to direct downwardly fluids issuing from such port.

For the purpose of sealing ports 28 after the normal under water exhaust passage is opened, as when the outboard motor is operating at full speed in boat propulsion, I provide a means independent of the engine cooling system for filling pipe 29 with water, thereby cutting off communication between ports 28 and port 30. This may be done in numerous ways, one of which involves the provision of partition 16 in the lower unit to form therein a passage 32 opening forwardly through a mouth 33 and communicating around bushing 34 with a duct at 35 opening at 36 through the wall of conduit 24 and pipe 29 into the interior of such pipe.

The only force acting to deliver water through the system of passages just described is the movement of the outboard motor through a body of water which establishes pressure at mouth 33 and tends to evacuate water through the delivery port 26 of the under water exhaust. Both the pressure established in chamber 32 and the depression established in chamber 25 will be, in general, proportioned to the rate of operation of the motor and hence it is easily possible to locate ports 28 and 30 at such a height that communication therebetween will be sealed by the rise of water in pipe 29 at approximately the same time that the under water exhaust through the flattened tube 26 becomes effective.

In order to keep the pipe 29 full of water during normal motor operation, the amount of water supplied to the pipe is preferably such that some of the water will flow through port 30. Under such circumstances, some of it may also flow through the ports 28, but this is immaterial since the amount of such water will be small and therefore will not destroy the effective sealing of such ports. The pressure conditions existing in the exhaust manifold during full operation of the motor will not encourage a loss of sealing water therein and such loss is reduced also by the fact that openings 28 are small in diameter, while the combined area is effective for by-passing gases, and resistance to flow of a liquid is greater than would be the case if a single port of like area were used.

It is particularly to be noted that no loss of water through ports 28 can affect in any way the cooling system for the motor since the source of such water is entirely independent of the cooling system. It is also to be noted that there are no moving parts such as might become stuck, no valves being used.

I claim:

1. The combination with a marine engine having an exhaust manifold, with a submersible outlet and an atmospheric by-pass, of means for establishing a liquid seal for said by-pass.

2. The combination with a marine engine having an exhaust manifold, with a submersible outlet and an atmospheric by-pass, of means for establishing a liquid seal for said by-pass, and means for freeing said submersible outlet of water accumulated therein, both of said means being dependent for their operation upon movement through a body of water, whereby said seal will be established as said outlet is freed of water.

3. In an outboard motor, the combination with an engine having a by-passing exhaust manifold and a lower unit provided with an under water outlet for said manifold, said lower unit being provided with a forwardly disposed opening, and a well communicating with said opening and extending across the by-pass of said manifold whereby water admitted through said opening as said outboard motor is in movement at a predetermined rate will fill said well to the point of sealing said by-pass.

4. In an outboard motor, the combination with an engine having an exhaust manifold provided with a by-pass including a well having exhaust gas inlet and outlet openings, of a lower unit provided with a submersible outlet with which said manifold is in communication, and a submersible water inlet communicating with said well and opening in a direction to receive water in the movement of said lower unit, whereby, at a predetermined rate of movement of said lower unit, to elevate water into said well to a depth sufficient to cover one of said openings to seal said by-pass.

5. In an outboard motor, the combination with an engine having an exhaust manifold provided with a by-pass including a well having exhaust gas inlet and outlet openings, of a lower unit provided with a submersible outlet with which said manifold is in communication, and a submersible water inlet communicating with said well and opening in a direction to receive water in the movement of said lower unit, whereby, at a predetermined rate of movement of said lower unit, to elevate water into said well to a depth sufficient to cover one of said openings to seal said by-pass, said lower unit being provided with a cooling system of which said duct is entirely independent.

6. In an outboard motor, the combination with an engine having an exhaust manifold provided with a submersible outlet and a by-pass duct to open air above water, of a lower unit for said engine including a cooling system conduit therefor and a forwardly opening duct independent of said conduit and adapted in the movement of said unit to receive water, said duct being extended across the by-pass of said manifold whereby water rising in said duct will act as a seal for said by-pass.

7. In an outboard motor, the combination with an engine having an exhaust manifold ported above the water level and provided with an outlet therebeneath in a rearward direction, whereby movement of the motor through the water will tend to exhaust gas from said manifold, of a forwardly disposed water inlet and a conduit connected with said inlet, extending across the port of said manifold and opening to discharge water outside of said manifold.

8. In an outboard motor, the combination with an engine having an exhaust manifold ported above the water level and provided with an outlet therebeneath in a rearward direction, whereby movement of the motor through the water will tend to exhaust gas from said manifold, of a forwardly disposed water inlet and a conduit connected with said inlet, extending across the port of said manifold and opening to discharge water outside of said manifold, said conduit including a well disposed within said manifold.

9. In an outboard motor, the combination with an engine having an exhaust manifold ported above the water level and provided with an outlet therebeneath in a rearward direction, whereby movement of the motor through the water will tend to exhaust gas from said manifold, of a forwardly disposed water inlet and a conduit connected with said inlet, extending across the port of said manifold and opening to discharge water outside of said manifold, and a lower unit connected with said engine and in which the opening of said duct is formed, said unit being provided with a cooling duct leading to said engine and of which said first mentioned duct is independent.

10. In an outboard motor adapted to be partly submerged to a predetermined water line, the combination with an engine having an exhaust manifold provided with an outlet below said water line and an atmospheric by-pass therefor above said water line, of a cooling system for said engine, a duct independent of said cooling system having an inlet below said water line and intercepting said by-pass at a level above said water line, and means effective in the operation of a motor for establishing a head of water in said duct above said level, whereby to provide a liquid seal for said by-pass in the operation of said motor.

11. The combination with a marine engine exhaust pipe having a submersible outlet and an atmospheric by-pass, of means, dependent upon engine operation, for directing water into said atmospheric by-pass.

12. In a marine engine of the outboard motor type provided with an exhaust duct having plural outlets, one above and one below normal water level, the combination therewith of means, dependent upon engine operation, for withdrawing water from the lower outlet and directing water to the upper outlet.

13. In a marine engine mechanism of the outboard motor type having a submersible portion and a downwardly extending exhaust duct provided with plural outlets above and below normal water level respectively, the combination with said mechanism, of means, dependent upon engine operation, for aspirating water from the lower of said outlets and delivering water to the upper outlet to impositively obstruct and muffle it.

14. The combination of boat propelling mechanism including an internal combustion engine provided with an exhaust duct having under water and atmospheric exhaust ports arranged with the under water exhaust port facing rearwardly with reference to the stern of the boat, and means whereby the forward motion of the submerged portion of the mechanism resulting from engine operation may be utilized to direct water into impositive obstructing relation to the atmospheric exhaust port.

15. The combination of a marine engine provided with an exhaust duct having outlets at different levels, and means, dependent upon engine operation, for aspirating water from the lower outlet and utilizing water to obstruct the upper outlet.

16. The combination with an engine and an exhaust system therefor having a plurality of outlets, one of said outlets comprising at least one relatively small atmospheric by-pass hole in an enclosure constituting a part of said system, of means effective in the operation of said engine for sealing said hole to divert exhaust gas therefrom to the other of said outlets, said means comprising a pipe terminating within said exhaust system, and means for delivering water through said pipe toward said hole, whereby at least a part of said water will tend to flow through said hole in the same direction in which the exhaust gases are by-passed therethrough in the absence of such water.

17. The combination with a marine engine having an exhaust pipe with an outlet intended for submerged operation and another outlet comprising an atmospheric by-pass, of means effective in the operation of said engine for delivering water to the interior of said pipe in a direction to tend to escape from said pipe through said atmospheric by-pass, whereby the inertia of said water in said by-pass will reduce exhaust noise.

18. In a marine engine installation, the combination with an engine and an exhaust system having an under water outlet and an atmospheric by-pass, of means including a pipe having an inlet adapted to be submerged in the operation of said installation and having an outlet disposed within said by-pass, whereby water circulated through said pipe in the operation of said installation would tend to pass through said by-pass in the same direction in which gases are by-passed therethrough.

19. The combination with a marine installation including an engine, an exhaust system, and a submersible portion including one exhaust outlet rearwardly directed with reference to the normal travel of said installation and one water inlet, said exhaust system having an atmospheric by-pass above normal water level, and a pipe leading from said inlet and provided with a discharge portion arranged to direct at least a portion of the water passing through said pipe to the interior side of said by-pass, whereby to pass through said by-pass in the same direction in which exhaust gases can be passed therethrough, said inlet including means for circulating the water effective upon the operation of said engine.

FINN T. IRGENS.